United States Patent [19]

Woollen et al.

[11] 3,821,257

[45] June 28, 1974

[54] TRIMELLITIC ACID ANHYDRIDE RECOVERY BY MULTI-DISTILLATION OF FLUID OXIDATION EFFLUENT CONTAINING TRIMELLITIC ACID, AQUEOUS ACETIC ACID, METAL CATALYST COMPONENTS AND ORGANIC OXIDATION BY-PRODUCTS WHEREIN PRIOR TO ONE DISTILLATION STEAM STRIPPING IS USED

[75] Inventors: J. Michael Woollen, Chicago; James D. Knobloch, Naperville, both of Ill.

[73] Assignee: Standard Oil Company, Chicago, Ill.

[22] Filed: Feb. 9, 1971

[21] Appl. No.: 114,046

[52] U.S. Cl. ............................ 260/346.4, 260/346.3
[51] Int. Cl. ............................................ C07c 63/32
[58] Field of Search ......... 260/346.3, 346.4; 203/96

[56] References Cited
UNITED STATES PATENTS

| | | | |
|---|---|---|---|
| 3,206,475 | 9/1965 | Malo | 260/346.3 |
| 3,472,740 | 10/1969 | Boothe | 203/96 |
| 3,484,458 | 12/1969 | Stein et al. | 260/346.4 |

Primary Examiner—John D. Randolph
Assistant Examiner—Bernard Dentz
Attorney, Agent, or Firm—Fred R. Ahlers; Arthur G. Gilkes; William T. McClain

[57] ABSTRACT

Trimellitic acid anhydride (intra-molecular anhydride of trimellitic acid) has poor initial molten color and molten color stability when recovered by vacuum fractional distillation of partially purified trimellitic acid anhydride (TMA) obtained by distilling aqueous acetic acid from fluid oxidation effluent from oxidation of pseudocumene with molecular oxygen to trimellitic acid in the presence of acetic acid and catalysis provided by polyvalent-transitional metal and source of bromine, thermal conversion to crude TMA of trimellitic acid of residue from said distillation and flashing partially purified TMA from said thermal conversion. Attendant poor initial molten color and molten color stability disadvantages are substantially eliminated by steam stripping partially purified TMA prior to vacuum fractional distillation.

6 Claims, No Drawings

3,821,257

TRIMELLITIC ACID ANHYDRIDE RECOVERY BY MULTI-DISTILLATION OF FLUID OXIDATION EFFLUENT CONTAINING TRIMELLITIC ACID, AQUEOUS ACETIC ACID, METAL CATALYST COMPONENTS AND ORGANIC OXIDATION BY-PRODUCTS WHEREIN PRIOR TO ONE DISTILLATION STEAM STRIPPING IS USED

BACKGROUND OF INVENTION

Trimellitic acid is used commercially as its acid anhydride (TMA) in the production of oil and water-soluble alkyd resins for surface coatings, thermosetting alkyd resins reinforced with glass fibers, poly-(amide-imide) high temperature insulating coatings, rigid polyurethane foams and plasticizer esters. Trimellitic acid can be conveniently prepared by the oxidation of pseudocumene with air under liquid phase conditions in the presence of acetic acid as solvent and in the presence of catalysis provided by one or more polyvalent-transitional metal oxidation catalysts and a source of bromine as first disclosed by U.S. Pat. No. 2,833,816.

Trimellitic acid (TMLA) is relatively soluble in acetic acid. Aqueous acetic acid (100 pounds) having 15–18 percent water as would be present in the fluid effluent from such liquid phase oxidation dissolves 3.2 pounds TMLA at 77°F. and 16.5 pounds at 230°F. Crystallization of TMLA from fluid oxidation effluent at temperatures of 60° to 100°F. leaves a substantial amount, 30–50 percent of originally produced, of TMLA dissolved in the acetic acid mother liquor. Process economics requires recovery of the major portion of the remaining dissolved TMLA. The dissolved TMLA when recovered by successive concentration of mother liquor and crystallization of TMLA product from each concentrate results in several additional crops of TMLA product each more contaminated with impurities than the preceding TMLA crystalline crop.

One technique for eliminating the foregoing crystallizations of TMLA from fluid oxidation effluent and concentrates thereof can be conducted in the following manner. The fluid oxidation effluent containing TMLA from pseudocumene (1,2,4-trimethylbenzene) oxidation by the above catalytic liquid phase oxidation is at a temperature of 200°–220°C. and a pressure of 300–350 pounds per square inch gauge (p.s.i.g.) pressure. This hot fluid oxidation effluent is stripped of aqueous acetic acid by flashing to a pressure from atmospheric pressure to 50 p.s.i.g. to remove a portion of aqueous acetic acid and form a concentrate and the concentrate is further heated to remove the remainder of the aqueous acetic acid and thermally convert TMLA to TMA at atmospheric pressure, preferably leaving a fluid crude TMA. The fluid (or molten) crude TMA is charged to vacuum flashing or distilling step wherein TMA and materials boiling below TMA are removed as overhead partially purified TMA fraction and leave a residue of materials boiling higher than TMA. The partially purified TMA is condensed and the liquid condensate is used as feed to vacuum fractional distillation conducted batchwise at an absolute pressure of 1–20 mm Hg., generally at or below 10 mm Hg. A forerun overhead fraction of materials boiling below TMA is first collected and then a TMA product fraction is recovered as heart-cut fraction. The residue contains TMA and materials boiling above TMA of which a substantial portion is the double anhydride of TMA (intermolecular anhydride between two moles of TMA).

Disadvantages of the above technique are that the TMA product condensate is of poor initial molten color, 600–700 on APHA color index, and becomes more disclored upon being held as a melt at 210°C. for two hours, e.g. reaching a color corresponding to APHA color index of 900–1000 and higher. Also there is a loss of TMA product to the formation of rather high boiling di-anhydride (intermolecular anhydride) of TMA which forms at temperatures from 250°C. and above which can occur in the obtension of partially purified TMA and vacuum fractional distillations. A further disadvantage is that the finally recovered TMA contains iso- and terephthalic acids which, although less volatile than TMA, codistill with TMA during the subatmospheric flashing.

Such phthalic acid isomers are mainly co-products of the oxidation of pseudocumene containing xylenes since pure pseudocumene is seldom used as feed for the oxidation. Also a portion of such phthalic acid isomers can form by decarboxylation of TMLA during its thermal conversion to TMA especially when such conversion is conducted at temperatures of 410°–430°F. or higher. Although the literature reports TMLA is converted to TMA at 421°F. concidental decarboxylation of TMLA to iso- and terephthalic acids does occur at 410°–430°F. and increases at higher temperatures.

U.S. Pat. No. 3,206,475 teaches that purified TMA recovery is feasible by vacuum fractional distillation provided steam is added when the bottom temperature is in the range of 500°–550°F. This addition of steam prevents substantial formation of the bis-anhydride. By use of such steam-aided vacuum fractional distillation of crude TMA, a product of 96–97 percent TMA content, is recovered.

Vacuum fractional distillation of crude TMA heretofor practiced has by necessity been practiced batchwise at an absolute pressure of 1–20 mm Hg., generally at or below 10 mm Hg. Techniques for accomplishing continuous vacuum fractionation of crude TMA had not been developed because excessive pressure drop through the rectification section of the fractionating column resulting in long exposure of stillpot contents to temperatures at or above 270°C. causing di-anhydride of TMA to form and requiring maintenance of such high stillpot temperatures to continue boil-up for fractionation. In general batchwise operation is started at a selected pressure within 1–20 mm Hg. and a pot temperature giving the necessary boil-up for separation of low boiling components. The pot temperature is subsequently increased somewhat regularly while TMA heart-cut fraction is being obtained and continued until temperature rate of increase becomes excessive.

French Pat. No. 1,556,414 discloses distilling the fluid oxidation effluent at a pressure of 200–800 mm Hg. and at a bottom temperature of 250°–300°C. under inert gas (e.g. nitrogen) atmosphere to remove acetic acid and convert TMLA to liquid crude TMA. The liquid crude TMA is subjected to high vacuum, less than 20 and preferably 1–10 mm Hg., rectification again under inert gas (e.g. nitrogen) atmosphere. The first fraction, 2–4 percent of charge, distilled is discarded; the middle (heart-cut) fraction is TMA product and amounts to 85–90 percent of TMA equivalent of TMLA in fluid oxidation effluent, and the bottoms are discarded. Said high vacuum fractionation is conducted with a bottom temperature initially at 200°–220°C. and raised progressively to about 280°C. Such vacuum rectification is typically batchwise operation.

The recovery process of the French Patent introduces both decarboxylation of TMLA occurring at temperatures of 210°C. and above and di-anhydride formation both by TMLA dehydration while removing acetic acid in the first distillation at 200–800 mm Hg. and bottom temperature of 482°–572°F. and by vacuum fractionation conducted to a final pot temperature of 280°C.

The disadvantages of poor initial molten color, molten color stability and bromine compound content of high (98–99 percent) purity TMA can be readily and conveniently overcome by the improvement afforded by mild steam stripping partially purified crude TMA, for example prior to its final distillation for TMA product recovery. This improvement for the recovery of such high purity TMA is summarized in the next section wherein specific embodiments and illustrated use of the improved TMA process are given.

SUMMARY OF INVENTION

A TMA recovery process has been devised which eliminates the disadvantages of the prior TMA recovery processes. This recovery process uses steam stripping of partially purified TMA prior to its distillation or fractionation to recover product TMA of high purity. Such use of steam is not the same as steam distillation where large quantities of steam to distilled products are used. But rather steam stripping differs from steam distillation in that much less steam is used and it is used prior to distillation. In the present use of steam, the steam causes decomposition of aromatic organic impurities, for example phenyl and bromophenyl esters and polyanhydrides. Such esters and anhydrides may be illustrated by the following possible generic formula:

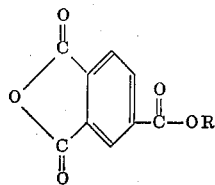

wherein R is phenyl; diphenyl; hydroxyphenyl; or benzoyl, hydroxybenzoyl and bromobenzoyl as in phenyl esters or in anhydrides with benzoic acid, bromobenzoic acid, hydroxybenzoic acid and the like. Still other ester and polyanhydride impurities not necessarily derivatives of TMA are also decomposed in the same manner. Evidence of the presence of all such foregoing impurities has been detected by mass spectrographic analysis of hydrolysis products of crude TMA. All such ester and anhydride impurities are minor contaminants compared to any one of the aromatic organic impurities before named.

The present inventive TMA recovery is applied to fluid oxidation effluents from pseudocumene oxidation which effluents contain TMLA and, for each 100 weight parts thereof, 177–336 parts aqueous acetic acid of 9–28 percent water (thus 91–72 percent acetic acid) and 5–25 parts aromatic organic impurities of the types before mentioned. Such fluid oxidation effluents can be derived from the liquid phase oxidation conducted to a final temperature of 205°–215°C. of a $C_9$ aromatic hydrocarbon feed containing 91–98 weight percent pseudocumene in the presence of 3–5 weight parts of 95–98 percent to acetic acid (2–5 percent water) and in the presence of the aforementioned catalysis provided by polyvalent-transitional metal (e.g. Co, Mn and Ce and mixtures thereof) and a source of bromine to provide total metals in the range of 0.005–0.010 total gram atoms of metal and 0.01 to 0.05 gram atoms of bromine per mole of the $C_9$ aromatic hydrocarbon feed.

According to the preferred use of the present inventive process fluid oxidation effluent is sequentially (a) flash stripped to remove aqueous acetic acid and partially (85–90 percent) dehydrate TMLA to TMA, (b) dehydrated completely under conditions suppressing decarboxylation to obtain crude TMA. (c) The crude TMA is vacuum flash distilled to obtain partially purified TMA contaminated with aromatic organic impurities under conditions minimizing bis-anhydride formation and also a residue. (d) The partially purified TMA is steam stripped at atmospheric pressure with superheated steam to remove an overhead impurity product in an amount of 2–10 percent of partially purified TMA charge, (e) the residue from step (d) is vacuum distilled under conditions further minimizing bis-anhydride formation. By this recovery, TMA product containing 20 to 30 ppm bromine and of good initial molten color and molten color stability can be obtained with a TMA content in said product of at least 97–98 percent.

SPECIFIC EMBODIMENTS

The flash stripping of fluid oxidation effluent is conducted at a pressure of 50 to 70 pounds per square inch gauge (p.s.i.g.) and 440°–460°F. temperature. This flash stripping removes aqueous acetic acid and leaves a liquid residue wherein only 85–90 percent of the TMLA is converted to TMA. Said temperature and pressure conditions for flash stripping avoid both decarboxylation of TMLA to iso- and terephthalic acids and formation of bis-anhydride. The liquid flash residue is then heated at a temperature of 450°–475°F. and a moderate vacuum in the range of 25–760 mm Hg. to complete dehydration of TMLA to TMA and provide a liquid crude TMA as residue.

The liquid crude TMA, obtained in a 98–99 percent yield equivalent of originally produced TMLA, is rapidly vacuum flashed at 10–20 mm Hg. absolute pressure and a vapor temperature of 460°–490°F., preferably as a film, either a falling, substantially vertical, film preferably scraped on a rotating surface of a cylinder, cone or frustrum of a cone whose axis is vertical; or on a scraped rotating surface of a cone or frustrum of a cone whose axis is substantially horizontal. Such vacuum distillation and temperature of operation provides a short residence time and minimizes bis-anhydride formation. The vapors from vacuum flashing, a partially purified TMA (mixture of vaporized TMA and aromatic impurities with some iso- and terephthalic acids), contain 98.4–98.6 percent of the TMA from the crude TMA charge. The vapor product has a 94–96 percent TMA content. The residue from such vacuum evaporation is a viscous, bubbly, dark colored flowable mass containing metal components of the catalyst, materials boiling higher than TMA, e.g. trimesic acid, some of the polyanhydride impurities and 50–70 percent TMA based on this residue. Such amount of TMA in the residue is needed for its flowability. This residue can be processed, if desired, to recover the catalyst metals, for example by calcining the residue to ash and selectively extracting the catalyst metals from the ash.

The mixture of vapors from vacuum flash distillation (94–96 percent TMA content) is condensed and the condensate is steam stripped with superheated steam. This steam stripping step is conducted at a pressure in the range of atmospheric up to 50 mm Hg. above atmospheric pressure with liquid partially purified TMA under temperature conditions where partially purified TMA remains liquid. The lowest temperature for such liquid state is about 445°–450°F. and temperatures of such liquid up to 475°–480°F. can be used. The superheated steam should be 5° to 20°F. above said liquid temperatures. This steam stripping step is conducted to remove from the partially purified TMA from 2–10 percent by weight of organic overhead which can be condensed with the steam water condensate, separated and discarded, preferably by incineration. Said organic condensate contains 13–25 percent of the original bromine-containing compounds in the crude TMA.

The liquid residue from the steam stripping step is used as feed to vacuum distillation to recover high quality TMA product. Vacuum distillation as mentioned before can be conducted as vacuum fractionation or two stage vacuum distillation. The latter provides higher recovery of product TMA when conducted with falling film of feed to each stage. The fractionation bottoms can be steam distilled to recover TMLA equivalent to 61–62 percent of the TMA content of the fractionation bottoms. Such recovered TMA can be recycled to step (b) wherein completion of TMLA dehydration occurs.

Two stage vacuum distillation is conducted at a top pressure of 5–10 mm Hg. in each stage and vapor temperature in each stage of 430°–460°F. preferably using the falling film techniques before described for vacuum fractionation. In such a two stage vacuum distillation the liquid residue from steam tripping is used as feed to the first stage and its liquid bottoms used as feed to the second stage. Second stage liquid bottoms have a 45–48 percent TMA content and are recycled to vacuum flash distillation. Vapors from each stage are collected, condensed at 350°–380°F. and the condensate filtered to remove dispersed solid iso- and terephthalic acids. The filtrate is high quality TMA having 20–30 ppm bromine content. The two stage vacuum distillation recovers 92–98 percent of the TMA and the vacuum fractionation recovers 82–88 percent of the TMA.

The following examples illustrate specific practices of the TMA recovery process of this invention.

EXAMPLES 1–4

A $C_9$ aromatic hydrocarbon feedstock containing 98 percent by weight pseudocumene is air oxidized under liquid phase conditions in the presence of 350 weight parts of acetic acid containing 3 percent water and catalysis provided by sources of cobalt, manganese and bromine supplying 0.0074 gram atoms total metal and 0.0158 gram atoms bromine per mole of pseudocumene. The oxidation provides a total pseudocumene residence time of 63 minutes during which the temperature is increased from 370° to 410°F., pressure increases gradually from 130 p.s.i.g. to 265 p.s.i.g. over the first 37–38 minutes, more slowly from 265 to 275 p.s.i.g. over the next 15 minutes and quite rapidly from 275 to 340 p.s.i.g. in the last 10 minutes.

Fluid oxidation effluent at 410°F. and 350 p.s.i.g. contains for each 100 pounds $C_9$ hydrocarbon charged 160 pounds of TMLA and 395 pounds aqueous acetic acid solvent containing 13.9 percent water. Also present are the aromatic organic intermediate and co-product impurities of the oxidation before mentioned.

The recovery process of this invention will be described in terms of continuous processing of said fluid oxidation effluent at a rate of 160 pounds TMLA content per hour.

I A. FLASH STRIPPING

The above described oxidation effluent is charged to a flash stripping zone operated at a pressure of 60 p.s.i.g. indirectly heated with a liquid heat exchange material at a temperature of 450°F. in suitable coils or jecket. There is removed from this flash stripping zone essentially all of the aqueous acetic acid solvent. Said solvent is removed as vapors provided by sensible heat removed while flashing from 350 p.s.i.g. to 60 p.s.i.g. and by heat supplied by said indirect heat exchange with hot liquid at 450°F. The residue contains, in addition to metal components of the catalyst and said organic impurities, a mixture of TMA and TMLA in which the TMA is equivalent to about 80–85 percent of TMLA in the oxidation effluent.

B. COMPLETION OF TMLA DEHYDRATION

Liquid residue from the flash stripping zone is charged into a pool of molten, crude TMA maintained at a temperature of 450°F. and a pressure of 50 mm Hg. in a dehydration zone having a hot condenser operated at 370°F. and an indirect heat exchanger (suitable coil or jacket) supplied with hot liquid to maintain the pool temperature. The TMLA in said liquid residue is not converted to TMA under those conditions of temperature and pressure. From said pool of molten crude TMA there is withdrawn by a pump hot (450°F.) liquid containing 146.3 pounds TMA which is equivalent to the 160 pounds TMLA in the oxidation effluent. This liquid is charged into a vacuum flash distillation zone in step (c).

C. VACUUM FLASH DISTILLATION

The molten liquid from step (b) and the recycle from the after described vacuum distillation provide the feed for this zone. The vacuum flash distillation zone is operated with a falling film under a pressure of 10 mm Hg. and vapor temperature of 462°F. The maximum surface temperature is 500°F. for supplying heat for said flash distillation. The generated vapors are withdrawn through a condenser operated at 400°F. The condensate contains 95 percent TMA which represents 98.5 percent of equivalent TMLA in the oxidation effluent. The viscous, dark, fluid residue flowing from the flash still may be discarded or processed for catalyst metal recovery.

D. STEAM STRIPPING

The 400°F. condensate from step (c), partially purified crude TMA, is charged into a steam stripping zone operated at atmospheric pressure and a liquid contents temperature of 445°–450°F. Steam superheated to 450°–455°F. is injected into the liquid. Four runs are made under these conditions as Examples 1 through 4 taking with the steam exiting from the stripping zone organic materials amounting to 2.0, 5.8, 6.4 and 10.8 weight percent respectively of the partially purified TMA charged. The liquid residue is vacuum fractionated.

E. VACUUM FRACTIONATION

Vacuum fractionation is conducted with a top vacuum of 10 mm Hg. and a bottom temperature of 500°–510°F. using a five plate column. The forecut fraction, materials having a vapor temperature below 460°F. is first collected. Product TMA of vapor temperature of 460°F. is separately collected. Bottoms are withdrawn for further processing. Each TMA product condensate contains 20–30 ppm bromine. The initial molten color of liquid TMA product at 210°C. and molten color after each product is held 2 hours at 210°C. (latter is "2 hour color") is determined by comparison against APHA (Hazen) Color Standards. The color values are tabulated below.

| Example No. | Initial Color | 2 Hour Color |
| --- | --- | --- |
| 1 | 90–100 | 250–300 |
| 2 | 100–125 | 350–400 |
| 3 | 80–90 | 350–400 |
| 4 | 200–250 | 200–250 |

For comparison, the process recovering TMLA by crystallization from fluid oxidation effluent, dehydration of TMLA to crude TMA and vacuum distillation of crude TMA gave a TMA product fraction (78 percent of potential TMA) having a bromine content of 150–200 ppm, an initial molten color of 600–700 and a 2 hour color of 900–1,000. Also, for a TMA recovery process similar to Examples 1–4 except that the steam stripping step (d) was omitted, the TMA product had a bromine content of 20 ppm, an initial color of 600–700 and a 2 hour color of 1,100–1,200.

The TMA recoveries by Examples 1, 2 and 3 are respectively 88, 85 and 83 percent of potential TMA in the fluid oxidation effluent. These yields can be increased to 92, 89 and 87 percent respectively, by steam distillation to hydrolyze the vacuum distillation bottoms and recover TMLA. Such a steam distillation is conducted at atmospheric pressure with steam superheated to a temperature of 500°–504°F. The distillate is collected in a receiver cooled to 77°F. at which temperature a solid layer and an aqueous layer form. The solid layer is recovered (56 percent of charge) by decantation and the decanted aqueous phase evaporated to recover additional solids (5.4 percent of charge). These solids are combined (62 percent TMLA equivalent in fractionation bottoms) and recycled to step (b) where completion of TMLA dehydration to crude TMA occurs.

EXAMPLE 5

The process of Examples 1–4 is repeated through step (d). The liquid residue is vacuum distilled in two series connected stages in the following manner.

E. VACUUM DISTILLATION

The liquid residue from steam stripping step (d) is used as feed. The liquid residue flows from the steam stripping zone to the first of two series connected falling film vacuum distillation zones. Both are operated at a vacuum of 6 mm Hg. and 440°–445°F. vapor temperature. Vacuum is applied through a product condenser operated at 380°F. which receives vapors from both vacuum distillation zones. The residual liquid from the first falling film vacuum distillation zone provides feed to the second falling film distillation zone and the residual liquid therefrom is recycled back as part of the feed to vacuum flash distillation step (c).

By the foregoing process TMA receovered in product condensate receiver step (d) is 143.3 pounds per hour which is equivalent to 98 percent of the TMLA in the starting oxidation effluent and this product contains 20 ppm total bromine. Said condensate contains impurities which are mainly suspended solid iso- and terephthalic acids. By removal of those suspended solids by filtration at 350°F. the impurity content of the product filtrate can be lowered to 0.5–0.6 weight percent. However for TMA use in the preparation of plasticizer esters and alkyd type resins unfiltered TMA product is satisfactory.

From analyses of the total solids of the fluid oxidation effluent, the product TMA and the discarded dark, viscous fluid residue from step (c) for iso- and terephthalic acids, a material balance for those two phthalic acid isomers showed that substantially no decarboxylation of TMLA occurred to form any additional phthalic acid isomers.

What is claimed is:

1. A process for recovery of intramolecular anhydride of trimellitic acid from a fluid oxidation effluent derived from the air oxidation of a $C_9$ aromatic hydrocarbon feed containing 91–98 weight percent pseudocumene in the presence of 3–5 weight parts of 95–98 percent acetic acid and catalysis provided by 0.005–0.010 total gram atoms of cobalt, manganese, cerium and mixtures thereof and 0.01–0.05 gram atoms of bromine per mole of said $C_9$ hydrocarbon at a final temperature in the range of 400°–420°F. which process consists essentially of the following sequence of steps each conducted continuously:

a. flash stripping from said fluid oxidation effluent substantially all of the aqueous acetic acid and converting 85 to 90 percent of the trimellitic acid to its intramolecular anhydride at a temperature of 440°–460°F. and a pressure of 50–70 p.s.i.g.;

b. completing the dehydration of trimellitic acid to its intramolecular anhydride in a dehydration zone containing a molten pool of crude intramolecular anhydride maintained at a temperature in the range of 450°–475°F. and an absolute pressure in the range of 25–760 mm Hg. and withdrawing from the dehydration zone an amount of said molten crude anhydride in an amount having an anhydride content equivalent to the trimellitic acid content of the fluid oxidation effluent feed to step (a);

c. charging said crude anhydride withdrawn from said dehydration zone and liquid distillation residue after obtained, as feed to a vacuum flash distillation zone operated at a temperature in the range of 460°–490°F. and a vacuum in the range of 10–20 mm Hg., withdrawing and condensing the generated vapors and withdrawing viscous fluid residue;

d. steam stripping said vapor condensate at atmospheric pressure and a temperature in the range of 445°–500°F. with steam superheated to 450°–520°F.; and e. vacuum distilling the molten residue from steam stripping at a vacuum of 5–20 mm Hg. and vapor temperature of 430°–480°F.

2. The process of claim 1 wherein the vacuum distillation is conducted by charging the steam stripped liquid as feed to the first of two series connected vacuum distillation zones each operated at a temperature in the range of 420–450°F. and a vacuum of 4–7 mm Hg. and the liquid residue from said first distillation zones is charged as feed to the second vacuum distillation zone, withdrawing and collecting the vapors from each of said distillation zones and condensing said collected vapors as recovered intramolecular anhydride of trimellitic acid product, withdrawing the liquid residue and recycling it as part of the feed to vacuum flash distillation.

3. The process of claim 2 wherein the vacuum distillations are operated on falling liquid films on the respective liquid feeds thereto.

4. The process of claim 2 wherein the viscous, fluid residue withdrawn from the vacuum flash distillation zone is further processed to recover the catalyst metals contained in said fluid residue.

5. The process of claim 2 wherein step (a) is conducted at a temperature of 450°F. and a pressure of 50 p.s.i.g. and 85 percent of the trimellitic acid in the feed thereto is converted to the intramolecular anhydride; step (b) is conducted at a temperature of 450°F. and a vacuum of 50 mm Hg., and each of the vacuum distillation zones are operated at a temperature of 440°–450°F. and a vacuum of 6 mm Hg.

6. The process of claim 1 wherein the vacuum fractionation is conducted by charging the steam stripped liquid obtained from step (d) into a vacuum fractionation zone operated at a top vacuum of 10–20 mm Hg. and a bottom temperature of 500–520°F., a forerun fraction is taken of vapors of a temperature below 460°–480°F. and TMA product fraction is taken of vapor of a temperature from 460°–480°F.

* * * * *

PO-1050
(5/69)

UNITED STATES PATENT OFFICE
CERTIFICATE OF CORRECTION

Patent No. 3,821,257          Dated June 28, 1974

Inventor(s) Michael J. Woollen & James O. Knobloch

It is certified that error appears in the above-identified patent and that said Letters Patent are hereby corrected as shown below:

Col. 2, Line 27    "concidental" should be coincidental
Col. 5, Line 42    "tripping" should be stripping
Col. 6, Line 40    "not" should be now
Col. 9, Line 20    "on" should be of Signed and sealed this 5th day of November 1974.

(SEAL)
Attest:

McCOY M. GIBSON JR.                    C. MARSHALL DANN
Attesting Officer                      Commissioner of Patents